UNITED STATES PATENT OFFICE.

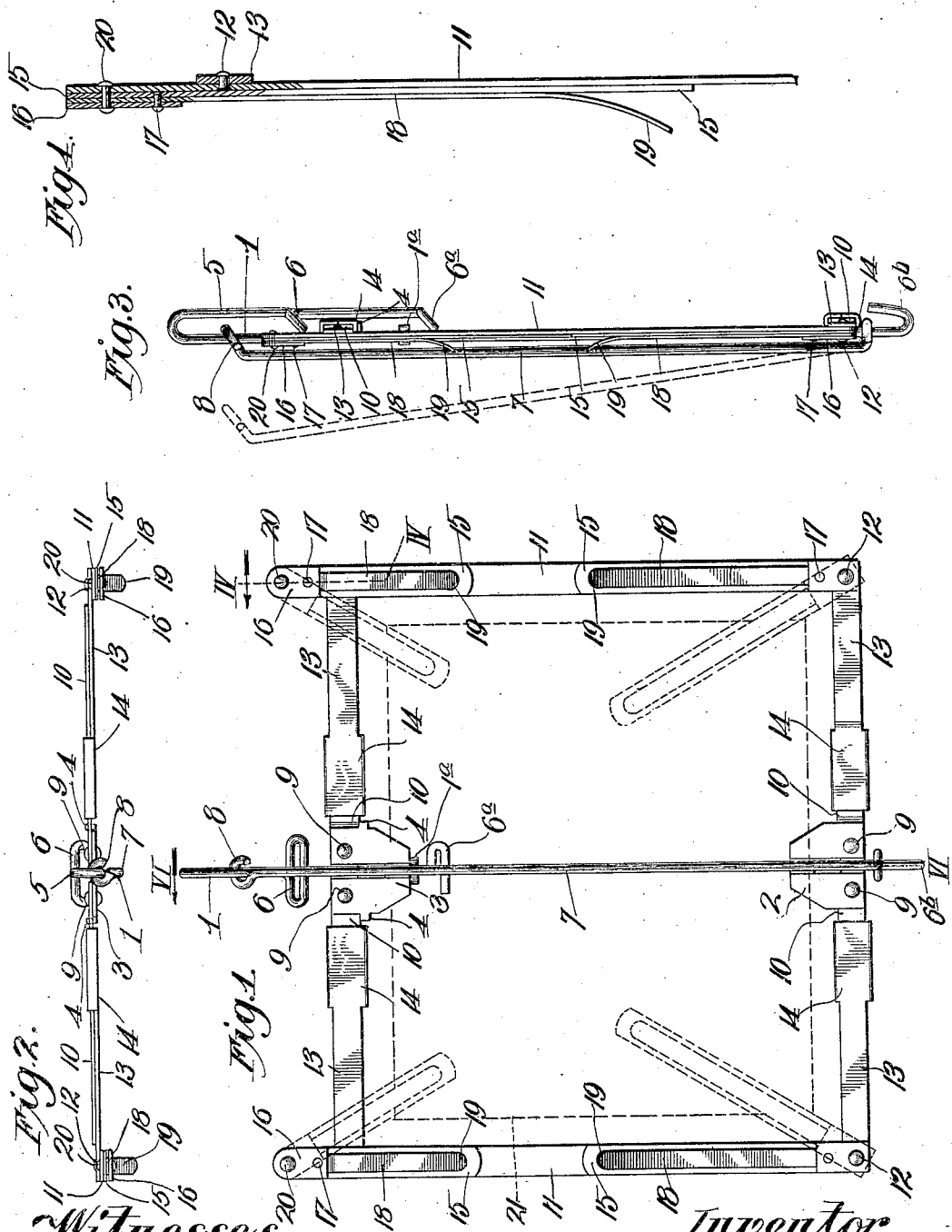

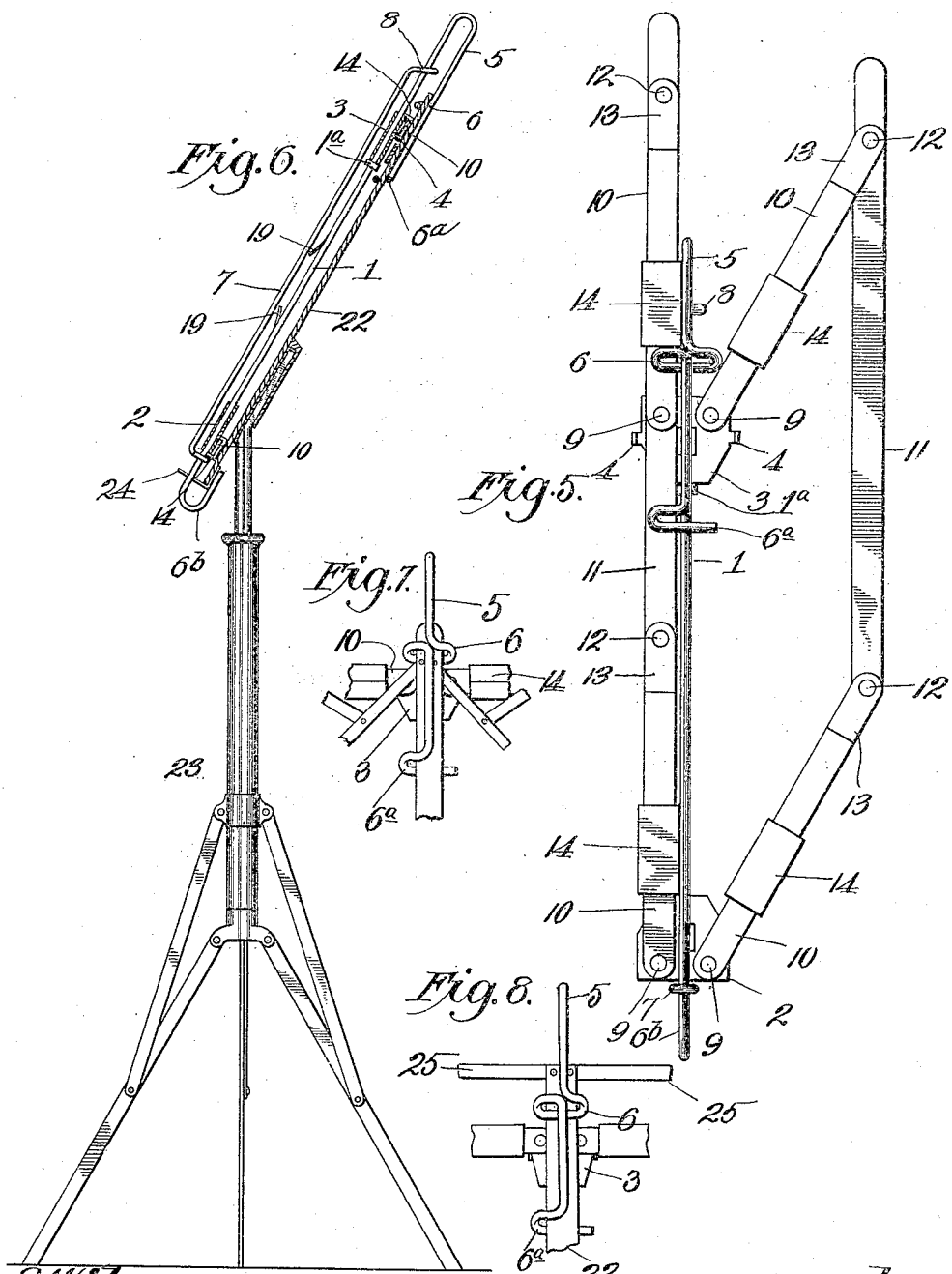

CHARLES J. WILLIS, OF BLACKWELL, OKLAHOMA.

MUSIC-STAND ATTACHMENT.

938,450.　　　　　Specification of Letters Patent.　　Patented Oct. 26, 1909.

Application filed May 21, 1909. Serial No. 497,502.

*To all whom it may concern:*

Be it known that I, CHARLES J. WILLIS, a citizen of the United States, residing at Blackwell, in the county of Kay and State of Oklahoma, have invented certain new and useful Improvements in Music - Stand Attachments, of which the following is a specification.

This invention relates to music stand attachments and is designed for use more particularly on stands when employed in connection with outdoor concerts, my special object being to produce an attachment which will reliably hold sheet music of any dimensions.

A further object is to produce an attachment embodying what may be termed a pair of leaves capable of turning so as to turn the leaves of the sheet music to present a different page or score to the musician.

A still further object is to produce an attachment which can be quickly and easily placed in or removed from operative position upon a music stand and which when not in use can be folded into small and compact form so as to be carried conveniently in one's hand or pocket.

A still further object is to produce a device of the character outlined which is of simple, strong, durable and cheap construction.

With these general objects in view and others as hereinafter appear, the invention consists in certain novel and peculiar features of construction and organization as hereinafter described and claimed; and in order that it may be fully understood reference is to be had to the accompanying drawings, in which;

Figure 1, is a front view of a music stand attachment embodying my invention. Fig. 2, is a top view of the same. Fig. 3, is a side view of the same. Fig. 4, is an enlarged sectional view of part of the attachment on the line IV—IV of Fig. 1. Fig. 5, is a rear view of the attachment with one leaf completely folded and the other partly folded. Fig. 6, is a side view of a music stand with the attachment fitting thereon, the latter being shown in section on the line VI—VI of Fig. 1. Fig. 7, is a rear view of the upper part of Fig. 6. Fig. 8, is a similar view showing a modified form of stand.

Referring now to the drawings in which like reference characters identify corresponding parts, 1 indicates a vertical rod of spring-metal forming the hinge rod of a pair of hinges 2 and 3, the leaves of the upper hinge 3, being provided with a pair of rearwardly-projecting lugs or stops 4. As a rest for the attachment, rod 1 is provided with a collar $1^a$, just below hinge 3, and at a suitable height above said hinge rod 1 is doubled rearwardly to form the vertically-depending arm 5 bent at its lower end to produce the vertically-alined angularly-arranged closed loop 6 and open loop $6^a$, for a purpose hereinafter explained, and below hinge 2, rod 1 is doubled rearwardly to produce an upturned hook $6^b$.

To insure the proper hinge action or turning of the leaves of the sheet-music, a spring rod 7 is secured at its lower end to the rod 1 below hinge 2, said rod extending substantially parallel with rod 1 and terminating with rod 1, and rod 7 is capable of being sprung forwardly as indicated by dotted lines Fig. 3, to facilitate insertion of sheet-music between it and said hinges.

Pivoted at 9 to the leaves of the hinges is a pair of arms 10, which in conjunction with the hinges, constitute what may be termed the inner portions of the leaves of the attachment.

The outer portions of the leaves are constructed as follows; 11 indicates a pair of bars extending parallel with the hinge rod, and pivoted at 12 to said bars are arms 13 equipped with sleeves 14 fitting telescopically and with a frictional relation on arms 10 in order to necessitate the application of force inward or outward on bars 11 to dispose the latter nearer together or farther apart to accommodate sheet music of varying width. Pivotally carried by the said outer portions of the leaves are spring-clamps constructed as follows; 15 and 16 are bars between which are secured by rivets 17 spring arms 18 having their free ends flaring at 19 with respect to bars 15 which by preference in length slightly exceed said spring arms. Two of the spring-clamps are pivoted on the pivots 12 connecting the lower ends of bars 11 with the outer ends of the lower pair of arms 13 and project upwardly. The remaining spring - clamps are by preference connected to the upper ends of bars 11 by pivots 20 and depend therefrom, all of the spring-clamps being capable of angular adjustment with respect to bars 11 as indicated by dotted lines in Fig. 1, in order that they may receive the corners of a sheet of music of less superficial area than the rectangular frame formed conjointly by the leaves as indicated by dotted lines 21, it being understood that the sheet of music is slipped between the bars 15 and spring-arms 18 by way of the flaring mouths produced by the flaring portions 19 of said spring-arms, it being also obvious that if the width of the sheet is materially greater than the width of said frame when expanded to its widest extent, said spring-clamps may be swung outward beyond bars 11 for the purpose of engaging corners of such large sheet of music. It will also be understood that the hinge or fold line of the sheet lies between the rod 1 and its rod 7, which respectively prevent the sheet buckling backward or forward at its middle, rod 7 also acting as a guide for the sheet in its folding movement as hereinbefore explained.

When the attachment is unfolded the downward or outward swinging movement of the leaves exclusive of the hinges is limited by the rearwardly-projecting lugs or stops 4 of hinge 3. To fold the attachment upward and inward, pressure is applied on the outer portions of the leaves to cause them to fold to a vertical position as indicated by one of them in Fig. 5, the other being only partly folded to illustrate the position of the parts in the course of the folding or unfolding operation, it being apparent that when both leaves are so folded, the attachment is in small and compact form and can be readily carried in one's hand or pocket.

Figs. 6 and 7 show the application of the attachment to the upwardly and rearwardly-projecting arm 22 of a stand 23 of the type shown, the attachment being secured in place by fitting it against the front side of arm 22 with hook 6$^b$, projecting up behind the ledge or rest 24 of and slipping the loop 6 upon the upper end of said arm, and loop 6$^a$ laterally on the arm, the loops standing at a sufficient angle to bind upon the arm 22 and with the hook 6$^b$ hold the attachment sufficiently firm to prevent it from slipping downward or being dislodged by a gust of wind.

With the type of stand shown by Fig. 8, in which the arm is equipped at its upper extremity with laterally projecting arms or bars 25, loop 6 is functionless, loops 6$^a$ being depended upon to secure the upper part of the attachment to the stand.

From the above description it will be apparent that I have produced a music stand attachment embodying the features of advantage enumerated in the statement of the object of the invention, and I wish it to be understood that I reserve the right to make such changes in the form, proportion, detail construction and arrangement of the parts as properly fall within the spirit and scope of the appended claims.

Having thus described the invention what I claim as new and desire to secure by Letters-Patent, is;

1. A music stand attachment, comprising a rod provided at its rear side with a depending arm and an upturned hook for engagement with the music stand, a rod forward of, and attached at its ends to the first-named rod, a pair of hinges mounted on said first-named rod, a pair of bars at opposite sides of and substantially paralleling said rods, arms pivotally connecting said parallel bars with the leaves of said hinges, and clamps pivoted to said parallel bars for supporting sheet music.

2. A music stand attachment, comprising a rod provided at its rear side with a depending arm, an upturned hook and a collar, a rod forward of, and attached at its ends to the first named rod, a pair of hinges mounted on said first-named rod and resting on said collar, a pair of bars at opposite sides of and parallel with said rods, extensible arms pivotally connecting said parallel bars with the leaves of said hinges, and spring-clamps pivoted to said parallel bars.

3. A music stand attachment, comprising a rod provided at its rear side with a depending arm and an upturned hook, a rod forward of, and attached at its lower end to the first-named rod and terminating at its upper end in a hook for detachable engagement with said rod, a pair of hinges mounted on said first-named rod below the hook of and behind said rod, a pair of bars at opposite sides of and parallel with said first-named rod, arms pivotally connecting said parallel bars with the leaves of said hinges, and clamps pivoted to said parallel bars.

4. A music stand attachment, comprising a rod provided at its rear side with a depending arm and an upturned hook, a spring rod forward of, and attached at its lower end to said first-named rod and terminating at its upper end in a hook for detachable engagement with said first-named rod, a pair of hinges mounted on said first-named rod below the hook of and behind said rod, a pair of arms pivoted to and projecting from the leaves of the hinges, a pair of bars paralleling said first-named rod, a pair of arms pivoted to said parallel bars and adjustably connected to said first-named arms, and spring-clamps pivoted to said parallel bars.

5. A music stand attachment, comprising a rod provided with a depending arm and an upturned hook, a rod attached at its lower end to the first-named rod and terminating at its upper end in a hook for detachable engagement with said first-named rod, a pair of hinges mounted on said first-named rod below the hook of and behind said last-named rod, lugs projecting rearwardly from the leaves of the uppermost hinge, arms pivoted to the leaves of the hinges, the arms pivoted to the leaves of the upper hinge being limited in their downward and outward swinging movement by said lugs, a pair of bars paralleling the first-named rod, arms pivoted to said bars and telescopically connected to the arms pivoted to the hinges, and spring-clamps pivoted to said parallel bars.

6. A music stand attachment, comprising a pair of hinges, a hinge rod extending through said hinges and provided above the top one with a depending arm terminating in a pair of loops and below the bottom with an upturned hook, a spring-rod disposed in front of the hinges and secured at its lower end to the first-named rod and terminating at its upper end above the upper hinge in a hook for detachable engagement with the said first-named rod above said upper hinge, a pair of bars paralleling said first-named rod, arms fitting telescopically together and pivotally connecting the last-named bars with the leaves of the hinges, and a spring-clamp pivoted to said parallel bars and adapted for adjustment in planes parallel with the faces of said bars.

In testimony whereof I affix my signature, in the presence of two witnesses.

CHARLES J. WILLIS.

Witnesses:
J. W. WYMER,
J. C. BLACKABY.